United States Patent [19]

Wilson

[11] 4,455,638
[45] Jun. 19, 1984

[54] RF RADIAL CHOKE FOR USE IN RECORD PLAYBACK APPARATUS

[75] Inventor: Robert M. Wilson, Hamilton Square, N.J.

[73] Assignee: RCA Corporation, New York, N.Y.

[21] Appl. No.: 364,690

[22] Filed: Apr. 2, 1982

[51] Int. Cl.³ .......................... H04N 5/80; G11B 9/06
[52] U.S. Cl. .................................................. 369/126
[58] Field of Search ................ 358/335, 342; 369/124, 369/126, 135, 151

[56] References Cited

U.S. PATENT DOCUMENTS

| 3,872,240 | 3/1975 | Carlson et al. | 369/126 |
| 3,872,265 | 3/1975 | Hilliker | 369/126 |
| 4,327,432 | 4/1982 | Lang et al. | 369/126 |

OTHER PUBLICATIONS

RCA Technical Note #1210 Jul. 21, 1978.

Primary Examiner—Robert L. Richardson
Attorney, Agent, or Firm—E. M. Whitacre; J. S. Tripoli

[57] ABSTRACT

In a record playback system which includes a substantially enclosed conductive arm carriage to support and translate a stylus/stylus arm assembly and an oscillator in the carriage to provide a signal at a given frequency, a symmetrical choke is formed in conjunction with the bottom of the carriage. The symmetrical choke is dimensioned to place an open circuit at a given radial distance from the stylus opening in the carriage bottom to reduce the radiation of energy from the playback system in a band of frequencies including the given frequency, and/or reduce the playback system's susceptibility to radiation from outside sources.

12 Claims, 4 Drawing Figures

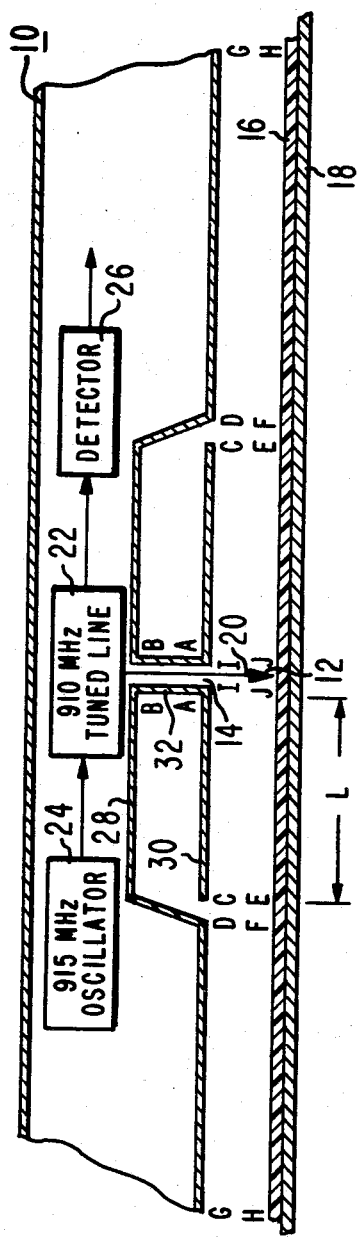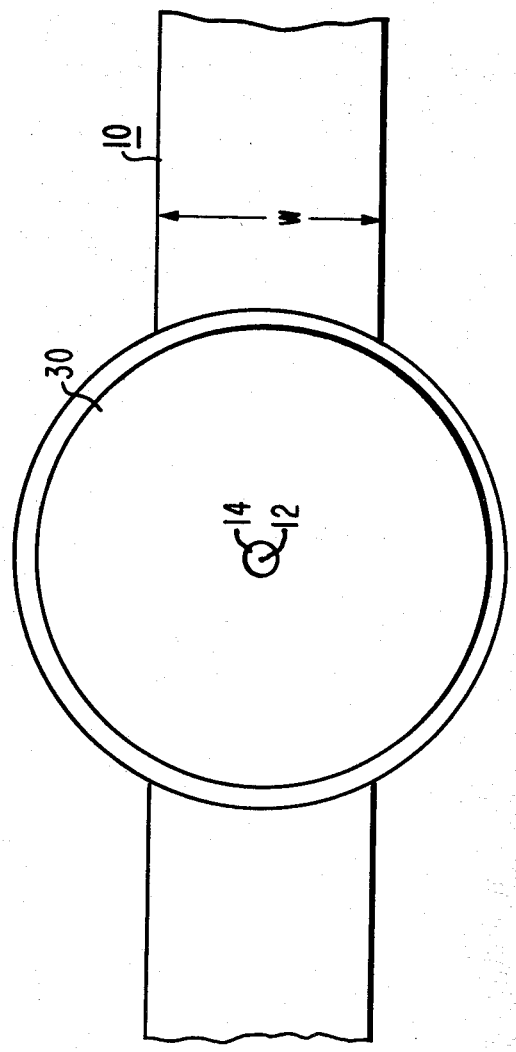

RF RADIAL CHOKE FOR USE IN RECORD PLAYBACK APPARATUS

The present invention relates generally to a technique for reducing RF energy radiated or received by a record playback device.

In a particular example of a record playback system, information is recorded in the form of geometric variations in the information track of a conductive plastic disc record. These geometric variations represent recorded modulated carrier signals. The particular example is that of a capacitive video disc system where FM modulated carrier signals are recorded as geometric variations in the depth of the information track. The television signal is retrieved from the video disc by detecting the change in capacity between an electrode on a stylus (such as a diamond stylus) and a conductive property of the disc. This disc-stylus capacity changes as a function of the carrier modulation on the information track when the record is rotated during playback.

This resultant changing capacity is then coupled to a tuned line in a resonator assembly which is driven by an oscillator operating at a particular RF frequency. Changing capacity from the stylus modulates the resonant frequency of the tuned line, this changes the operating point of the oscillator energy on the tuned line. This, in turn, amplitude modulates the oscillator signal. The amplitude modulated oscillator signal is then applied to a detector circuit which peak rectifies the oscillator signal.

In U.S. Pat. No. 3,842,194, issued to J. K. Clemens, a video disc system of the type mentioned above is generally described. U.S. Pat. No. 4,080,625, issued to H. Kawamoto describes in detail a pickup circuit of the type generally described above. U.S. Pat. No. 4,305,145, issued to L. Hughes, et al. shows generally a player mechanism suitable for a video disc system of the type previously described.

In a particular video disc playback device, the above mentioned oscillator in the pickup circuit operates at 915 MHz. The oscillator and the tuned circuit are both positioned within a conductive enclosure or arm carriage. The arm carriage is used to support and translate a stylus/stylus arm assembly.

To begin playback, the arm carriage is positioned over the record, which is rotated by a turntable, and the stylus arm is lowered so that the stylus at the end of the stylus arm engages the information track of the record. Although the arm carriage is a substantially enclosed metal box, an opening must be provided in the bottom of the carriage to permit stylus/record contact. It has been found that this carriage bottom opening allows energy at 915 MHz, and to a lesser extent harmonics thereof, to radiate out of the carriage area.

In the United States, the level of radiation at 915 MHz for the type of player described above, is below the maximum permissible levels set for such devices. However, in locations such as some countries in Europe, the amount of radiation at the oscillator fundamental frequency may exceed the local permissible levels. In addition, in any location, it is desirable to reduce the susceptibility of the player to interference from outside local sources of radiation.

The present invention provides a solution to the problem of the energy radiation (or susceptibility) levels at the oscillator fundamental frequency generated (or received) at the carriage bottom opening in a player of the type described above. In accordance with the present invention, apparatus is provided which comprises a means for providing a symmetrical choke formed in conjunction with the bottom of the arm carriage. The choke is arranged to form a high impedance during playback at a given radial distance from the stylus opening in a band of frequencies which includes the given frequency of the oscillator. The high impedance attenuates energy in the band of frequencies propagating between the carriage bottom and the disc record.

In the drawing:

FIG. 2 is a side view of an arm carriage including a radial choke in accordance with one embodiment of the present invention;

FIG. 3 is a bottom view of the arm carriage shown in FIG. 2; and

In general, and in the absence of the use of the radial choke of the present invention, it is believed that during normal playback operations radiation is initiated by E-fields originating at the stylus and propagating radially outward between the parallel plates formed by the bottom surface of the conductive arm carriage and the conductive video disc record. Since the arm carriage has an elongated rectangular bottom surface and since the carriage is variously positioned over the beginning, middle and center of the record during playback the resultant radiation as the E-fields reach the open end of their guided path is unsymmetrical.

The equivalent circuit of the stylus-arm-disc may be thought of in the context of a radial waveguide circuit. A main capacitance, $C_1$, between the stylus electrode and the disc, is part of the main signal path which couples the recovered information to the signal processing circuit via a conductive flylead member. A complex impedance, $Z_1$, of the radial waveguide created by the parallel surfaces of the carriage bottom and the record provides the main return path. In addition, there are stray capacitances, $C_2$, between the stylus electrode and the disc, and $C_3$, between the stylus electrode and the bottom of the arm carriage. Ideally, it would be desirable to reduce $C_2$ and $C_3$ to zero and to minimize the complex impedance $Z_1$. Since $Z_1$ is formed from a complex combination of reflected impedances, it has a value which is constantly changing as the arm progresses from the outside to the inside radius of the record during playback.

The real part $R_1$ of the complex impedance $Z_1$, is formed from two components, i.e., the ohmic losses of the waveguide circuit, $R_L$, (principally due to losses in the record material), and, the radiation resistance $R_P$, which is proportional to the power lost due to radiation.

If one could approach the design of the waveguide circuit in a manner which would make $R_L$ very close to zero, then the value of $Z_1$ could be made close to zero by making the radial waveguide structure circularly symmetrical about the stylus and then adding an antiresonant choke section at some distance L from the stylus to thereby effectively reduce the value of $R_P$ to near zero.

Figure 1:
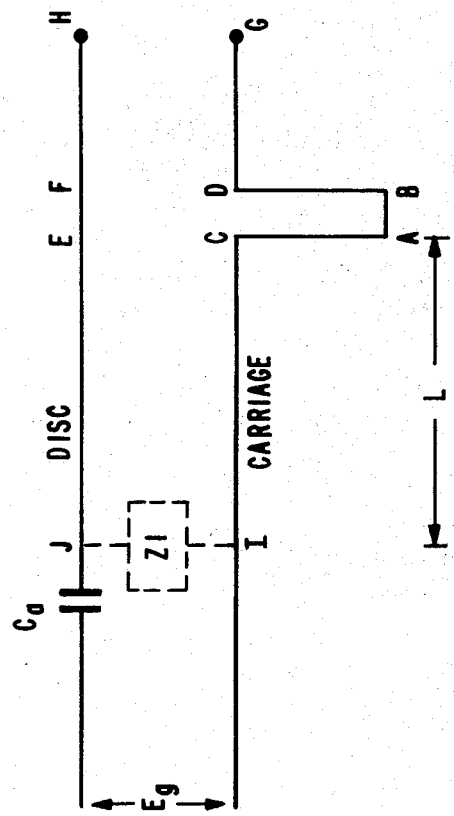
FIG. 1 is an equivalent circuit useful in explaining the present invention.

In FIG. 1, the upper line represents the disc top surface and the lower line represents the bottom of the arm carriage. Points A-B are the short circuited ends of an antiresonant choke section. The short circuit present at A-B transforms to a theoretically infinite impedance at C-D at the center frequency of the source generator (stylus) represented by Eg. Since D-F is in series with C-D, C-F also appears as an open circuit. CE, for all practical purposes, equals C-F (i.e., is an open). If L is selected to be the proper length, the open circuit present at C-E will transform to a short circuit at I-J. Under these conditions the impedance Z1 is, ideally, equal to zero.

In the equivalent circuit of FIG. 1, the capacitance $C_a$ represents the parallel combination of the main variable capacitance C1 and the stray capacitance C2 between the flylead and the disc. Since the value of C1 is much smaller than the value of C2, the capacitance Ca, under steady state conditions, is approximately equal to C2 (about 0.05 pf). The source Eg is representative of the voltage appearing across the capacitance C3 (i.e., the stray capacitance from the flylead to the carriage bottom). The designation of H-G represents the end of the radial waveguide path between the disc and the carriage bottom.

FIG. 2 shows the side view of a substantially enclosed conductive arm carriage 10 having a symmetrical radial choke formed in conjunction with the bottom of the carriage. FIG. 2 will be related back to the equivalent circuit of FIG. 1. A stylus 12 is shown protruding through an opening 14 to make contact with a record 16 resting on a turntable 18. In certain situations it may be desirable to make the turntable 18 from a conductive material.

A flylead 20, shown schematically in FIG. 2, couples signals from the electrode of the stylus to a 910 MHz tuned line 22. An oscillator 24 is provided in the arm carriage to inject the 915 MHz signal into the tuned circuit which will then be modulated by the varying capacity of the stylus-disc interface as previously described. The amplitude variations of the 915 MHz signal which come from the changes in capacity are peak detected in circuit 26 and the detected signal is then available for further processing to recover the originally recorded video information.

The stylus which is on one end of a stylus arm in a cartridge (not shown) is positioned in the carriage 10 which then supports and translates the stylus/stylus arm assembly radially over the record during playback.

The embodiment of the radial choke shown in FIG. 2 may be viewed as being formed from three parallel circular disc sections arranged concentically one above the other to form two choke portions. The first disc section 28 and the second disc section 30 form the first choke portion. The disc section 30 and the upper surface of the record 16 forms the second choke portion. The disc section 30 has a conductive collar 32 which connects the disc section 30 to the disc section 28 which is formed from the bottom of the conductive carriage 10.

The short circuit at the collar, i.e., position A-B, is transformed into an open circuit at position C-D of the radial transmission waveguide. Since D-F is in series with C-D, then C-F (and for all practical purposes C-E) also appear as an open circuit. The open at C-E transforms back to I-J as a short when the distance L is selected to be approximately 0.14 wavelengths at 915 MHz.

The apparatus described with respect to FIGS. 1 and 2 comprise two portions which contribute to the attenuation of energy radiated (or received). The first portion is the radial waveguide portion from I-J to C-E which transforms an open circuit at C-E back to a short circuit or low impedance at I-J. This is analogous to placing a low impedance cylinder around the stylus in the I-J location. The second portion is the provision of the open circuits in the C-D, C-F, C-E location. Energy propagating down the radial waveguide from the stylus area will be highly attenuated by this series open circuit (or very high impedance) condition.

The arrangement of FIG. 2 is effective in attenuating energy over a fairly large bandwidth centered at 915 MHz. As will be explained in more detail herein, there are other embodiments of the present invention which may also be used to advantage.

FIG. 3 shows the bottom view of the arm carriage 10. Here it is shown that even though the distance L is only 0.14 wavelengths to achieve the first resonance in the open circuited radial choke section, the choke discs 30 and 28 extend beyond the width dimension W of the carriage 16.

In actual practice, in a system where there is substantial overhang of the choke section relative to the arm carriage the performance tends to be not as good at the beginning of record playback compared to the middle regions of record playback. This results from the fact that at the beginning of playback, when the carriage is at the outer radius of the record, a portion of the disc section 30 does not overlie the record. This breaks down the radial transmission waveguide in this area. This situation may be improved by using a conductive turntable which is larger than the disc record so that the waveguide action is preserved in the outer radius area of record playback. Generally, it has been found that metal covered turntables have improved the overall response of the choke system to reduce radiation of energy at and around the frequency of interest.

As previously mentioned, it is desired to make the impedance Z1 very low (ideally zero) to maximize the current in the stylus resonator circuit and, also, to develop near zero incident voltage at the input of the radial waveguide. That is, a low value of Z1 gives better pickup sensitivity and reduces the amount of energy injected into the radial waveguide from the source end.

It is possible, however, to effectively attenuate energy at 915 MHz which would otherwise radiate out of the far end of the radial waveguide even though Z1 is not equal to zero. At the center frequency of 915 MHz it is the choke section (from A-B to C-D) that actually stops the radiation by presenting a good open circuit in series with the propagation path.

It has been shown experimentally that a choke design where the distance L is less than 0.14 wavelengths at 915 MHz, so that the distance L is within the dimension W of the arm carriage, is still effective in attenuating energy although over a smaller, but still usable, bandwidth. The key element here being that the choke portion providing the open circuit is designed to provide a good open circuit at the center frequency of interest.

Figure 4:
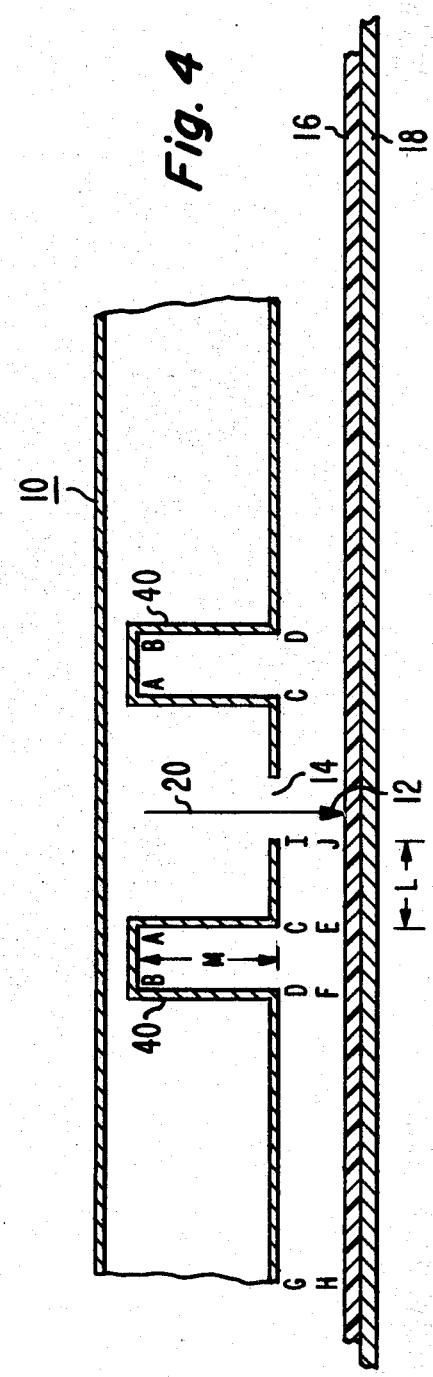
FIG. 4 is a side view of an arm carriage including another embodiment of the present invention.

FIG. 4 is a diagram illustrating another embodiment of the invention where the distance L is made less than 0.14 wavelengths at 915 MHz. The diagram shows a cross sectional view looking into the side of the arm carriage 10. In this case a cylindrical waveguide structure 40 rises up from the bottom of the arm. That is, the structure is formed from two concentric conductive cylinders joined at the top by the A-B short circuit. The distance M is chosen to make the structure antiresonant at 915 MHz. In the case of the cylindrical choke the distance M is equal to $\frac{1}{4}$ wavelength at 915 MHz. The overall structure can now be made to have a diameter which is less than the width W of the arm carriage.

The structure of FIG. 4 may be further reduced in size by using folding techniques so that the distance M is not all in one direction. The choke section having the distance M may be folded back on itself one or more times. Further reductions in size may be accomplished by dielectric loading of the choke section so that the antiresonant condition may be achieved with a shorter distance of M.

The type of structure shown in FIG. 4 is effective over a band of frequencies which is smaller than the band of frequencies covered by the structure of FIG. 2.

The use of the present invention has shown that radial chokes can be made to attenuate RF radiation originating from the stylus area. From the reciprocity theory of passive radiating elements, such chokes should also be effective in reducing the susceptibility of the video disc player to RF interference from outside sources over the same band of frequencies.

What is claimed is:

1. In a record playback system of the type having a substantially enclosed conductive arm carriage for supporting and translating a stylus/stylus arm assembly during playback, said arm being operatively positioned above said record, said carriage having an opening in the bottom thereof to permit selective stylus/record engagement, said playback system including an oscillator providing a signal at a given frequency, the apparatus comprising:

means for providing a symmetrical choke formed in conjunction with the bottom of said arm carriage such that a high impedance is formed at a given radial distance from said stylus opening in a band of frequencies including said given frequency whereby energy in said band of frequencies and propagating along a path formed between said record and the bottom of said carriage is substantially attenuated.

2. The apparatus according to claim 1 wherein said symmetrical choke means comprises a symmetrical conductive choke section attached to the bottom of said carriage and having an opening on one end, said opening being symmetrically disposed relative to said stylus opening, at said given radial distance, and, having a symmetrical member providing a short circuit at the other end of said choke section, and, wherein the distance from the short circuiting member to said choke section opening is selected to make said choke section substantially antiresonant at said given frequency.

3. The apparatus according to claim 2 wherein the given distance is substantially equal to the choke section antiresonant distance.

4. The apparatus according to claim 3 wherein the given distance is less than the choke section antiresonant distance.

5. In a record playback system of the type having a substantially enclosed conductive arm carriage for supporting and translating a stylus/stylus arm assembly during playback, said arm being operatively positioned above said record, said carriage having an opening in the bottom thereof to permit selective stylus/record engagement, said carriage enclosing an oscillator providing a signal at a given frequency, the apparatus comprising:

a symmetrical choke formed from conductive materials, said choke having a symmetrical opening in the bottom of said arm carriage, said opening being at a given radial distance from said stylus opening, said choke further comprising a symmetrically disposed short circuiting member connected to said symmetrical choke opening by a waveguide path of a certain distance, said certain distance being selected to provide a substantially open circuited condition at said symmetrical choke opening in a band of frequencies including said given frequency.

6. The apparatus according to claim 5 wherein said given radial distance and said certain distance are substantially equal.

7. The apparatus according to claim 6 wherein said choke comprises a conductive disc having a central aperture corresponding to said stylus opening, a conductive collar connecting said central aperture to said carriage bottom to provide said short circuiting member, and wherein said conductive disc is spaced from said carriage bottom near the distal end of conductive disc to form said symmetrical choke opening.

8. The apparatus according to claim 7 wherein said given radial distance and said certain distance are both substantially equal to 0.14 wavelength at said given frequency.

9. The apparatus according to claim 5 wherein said given radial distance is less than said certain distance.

10. The apparatus according to claim 9 wherein said choke comprises:

a first conductive cylinder attached to said carriage bottom at said given radial distance and extending a particular height above said carriage bottom;

a second conductive cylinder attached to said carriage bottom at a radial distance greater than said given radial distance and extending said particular height above said carriage bottom, said symmetrical choke opening being formed in said carriage bottom between said first and second cylinders; and a symmetrical conductive disc coupling said first and second cylinders at said particular height to form said short circuiting member;

said particular height being selected to be a quarter wavelength at said given frequency.

11. The apparatus according to claim 5 wherein said waveguide path includes a dielectric material.

12. The apparatus according to claim 5 wherein said waveguide path is folded back on itself one or more times.

* * * * *